United States Patent [19]

Raue et al.

[11] 4,376,728
[45] Mar. 15, 1983

[54] PROCESS FOR THE PREPARATION OF CATIONIC ALKYLARYLHYDRAZONE DYESTUFFS AND COLOR BASES THEREOF

[75] Inventors: Roderich Raue; Hans-Peter Kühlthau, both of Leverkusen, Fed. Rep. of Germany

[73] Assignee: Bayer Aktiengesellschaft, Leverkusen, Fed. Rep. of Germany

[21] Appl. No.: 271,164

[22] Filed: Jun. 8, 1981

[30] Foreign Application Priority Data

Jun. 25, 1980 [DE] Fed. Rep. of Germany ....... 3023854

[51] Int. Cl.³ .................. C07D 27/38; C09B 23/16
[52] U.S. Cl. .................................. 260/165; 542/417
[58] Field of Search .................... 542/417; 260/165

[56] References Cited

U.S. PATENT DOCUMENTS

| | | | |
|---|---|---|---|
| 3,769,279 | 10/1973 | Kuhlthau et al. | 542/417 |
| 3,773,764 | 11/1973 | Lehment et al. | 260/165 |
| 3,984,437 | 10/1976 | Fujino et al. | 542/417 |
| 4,168,264 | 9/1979 | Koller et al. | 260/165 |
| 4,248,775 | 2/1981 | Raue et al. | 260/165 |
| 4,251,656 | 2/1981 | Loew et al. | 542/417 |

OTHER PUBLICATIONS

Kuhn et al., Berichte 63(1930) pp. 3176-3183.

Primary Examiner—Arthur P. Demers
Attorney, Agent, or Firm—Sprung, Horn, Kramer & Woods

[57] ABSTRACT

To prepare dyestuffs of the general formula

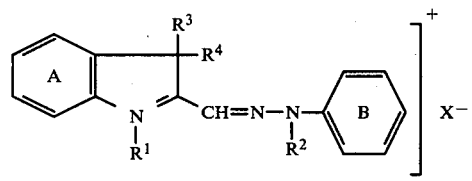

or color bases of the general formula

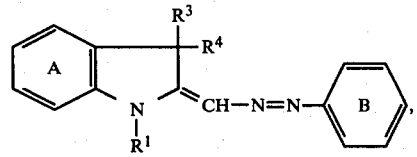

wherein
$R^1$ and $R^2$ denote hydrogen, alkyl, alkenyl or aralkyl,
$R^3$ and $R^4$ denote methyl or ethyl and
$X$ denotes an anion, and wherein the rings A and B and the radicals $R^1$ and $R^2$ can carry non-ionic substituents and the rings A and B can carry further fused-on rings, an amine of the formula

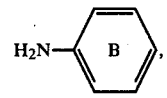

wherein
B has the abovementioned meaning, and a compound of the formula

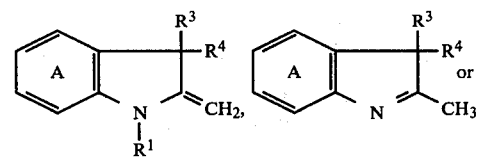

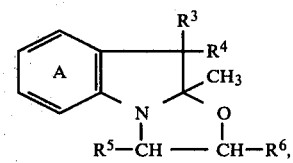

wherein
$R^1$, $R^3$, $R^4$ and A have the abovementioned meanings and
$R^5$ and $R^6$ represent hydrogen, alkyl, alkoxy, phenoxy or phenyl, are reacted, in the presence of an acid, with a substance which releases nitrous acid and, if appropriate, the product is then reacted with a compound which forms the radicals $R^{1'}$ and/or $R^{2'}$, which represent alkyl, alkenyl or aralkyl which are optionally substituted by non-ionic radicals, and X.

10 Claims, No Drawings

PROCESS FOR THE PREPARATION OF CATIONIC ALKYLARYLHYDRAZONE DYESTUFFS AND COLOR BASES THEREOF

The present invention relates to a process for the preparation of dyestuffs of the general formula

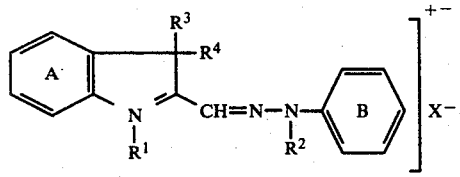   I wherein
$R^1$ and $R^2$ denote hydrogen, alkyl, alkenyl or aralkyl,
$R^3$ and $R^4$ denote methyl or ethyl and
$\overline{X}$ denotes an anion,
and wherein the rings A and B and the radicals $R^1$ and $R^2$ can carry non-ionic substituents and the rings A and B can carry further fused-on rings, or of colour bases thereof, of the general formula

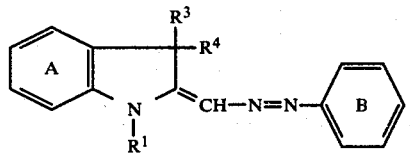   II characterised in that an amine of the formula

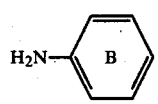   III and a compound of the formula

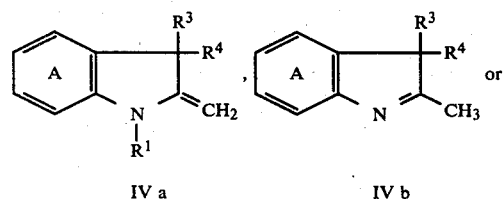

IV a                IV b

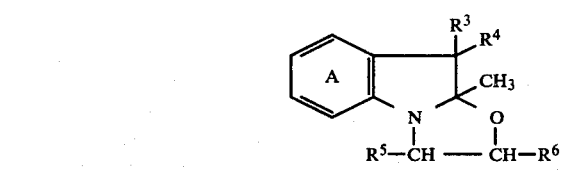

IV c wherein
$R^1$, $R^3$, $R^4$, A and B have the abovementioned meanings and
$R^5$ and $R^6$ represent hydrogen, alkyl, alkoxy, phenoxy or phenyl,
are reacted, in the presence of an acid, with a substance which releases nitrous acid and, if appropriate, the product is then reacted with a compound which forms the radicals $R^{1'}$ and/or $R^{2'}$, which represent alkyl, alkenyl or aralkyl which are optionally substituted by non-ionic radicals, and $\overline{X}$.

The invention also relates to the use of the dyestuffs thus obtained for dyeing acid-modified synthetic fibres, and to liquid formulations obtained by the process.

By non-ionic substituents in the context of the present invention there are to be understood the substituents which are customary in dyestuff chemistry and do not dissociate under the usual preparation and use conditions, such as halogen, for example fluorine, chlorine and bromine, and hydroxyl, alkyl, alkenyl, aryl, aralkyl, aryloxy, alkoxy or hydroxyalkoxy, cycloalkoxy, aralkoxy, aryloxyalkoxy, alkylthio, aralkylthio, arylthio, nitro, cyano, formyl, alkylcarbonyl, arylcarbonyloxy, alkylcarbonyloxy, alkoxycarbonyloxy, alkylcarbonylamino, alkylaminocarbonyloxy, alkylsulphonylamino, ureido, N-alkyl-ureido, aryloxycarbonylamino, alkoxycarbonylamino, carbamoyl, N-alkyl-carbamoyl, N,N-dialkyl-carbamoyl, N-alkyl-N-aryl-carbamoyl, sulphamoyl, N-alkyl-sulphamoyl, N,N-dialkyl-sulphamoyl, alkylsulphonyl, alkenylsulphonyl, arylsulphonyl, aralkylsulphonyl, aryloxysulphonyl, aryloxycarbonyl, alkoxycarbonyl, aralkoxycarbonyl, mono-, di- or tri-alkylsulphamidine, alkylarylsulphamidine, alkylcycloalkylsulphamidine and arylazo. Polyglycol ether radicals with halogen, hydroxyl or alkoxy substituents are also suitable.

In the formulae and in the abovementioned non-ionic substituents, by alkyl radicals there are to be understood, in particular, $C_1$- to $C_8$-alkyl radicals, and by alkenyl radicals there are to be understood, in particular, $C_3$- to $C_5$-alkenyl radicals.

Suitable aryl radicals are, in particular, the phenyl or naphthyl radical.

Suitable aralkyl radicals are, in particular, the benzyl, $\alpha$- or $\beta$-phenylethyl or $\alpha$-, $\beta$- or $\gamma$-phenylpropyl radical.

By cycloalkyl there is preferably understood cyclohexyl.

Naphthalene, tetralin or benzodioxane systems, for example, are formed by fusing further rings onto the rings A and B.

The aliphatic and isocyclic radicals can in turn carry the abovementioned non-ionic substituents.

Possible anionic radicals $\overline{X}$ are the organic and inorganic anions customary for cationic dyestuffs.

The anion is generally determined by the preparation process and any purification or precipitation of the crude dyestuff which may be carried out. In general, the dyestuffs are in the form of halides, in particular chlorides or bromides, or methosulphates, ethosulphates, sulphates, benzene- or toluene-sulphonates or acetates. The anions can be replaced by other anions in a known manner.

The process is particularly suitable for the preparation of dyestuffs of the formula

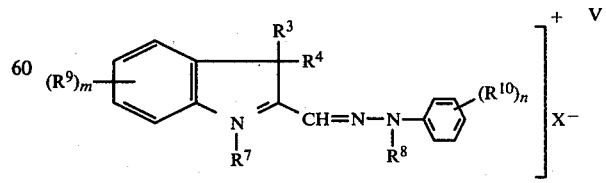   V wherein
$R^3$, $R^4$ and X have the same meaning as in formula 1 and $R^7$ represents hydrogen, or alkyl which has 1 to 4 carbon atoms and can be substituted by halogen, hydroxyl, cyano, $C_1$- to $C_4$-alkoxy, $C_1$- to $C_4$-alkylcarbonyloxy, phenoxy or phenyl, $R^8$ represents hydrogen, or alkyl which has 1 to 4 carbon atoms and can be substituted by hydroxyl, $R^9$ and $R^{10}$ represent hydrogen, halogen, alkyl or alkoxy with 1 to 4 C atoms, benzyl, benzyloxy, phenyl or phenoxy radicals, which can in turn be substituted by halogen or alkyl or alkoxy with 1 to 4 C atoms, or represent acetyl, benzoyl or a carboxylic acid ester radical with 1 to 4 C atoms, or $R^{10}$ represents phenylazo or, together with the benzene ring, a tetralin, naphthalene or benzodioxane ring system, and m and n represent 1 or 2, or of colour bases of such salts of the formula V, wherein $R^8$ represents hydrogen, by reaction of an amine of the formula

and a compound of the formula

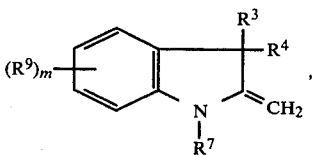

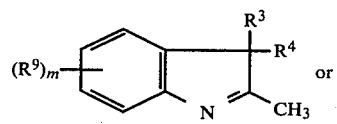

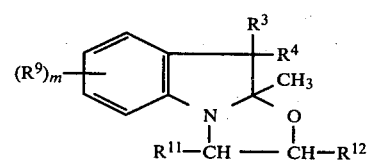

wherein $R^3$, $R^4$, $R^7$ to $R^{10}$, m and n have the abovementioned meaning and $R^{11}$ and $R^{12}$ represent hydrogen, alkyl or alkoxy with 1 to 4 carbon atoms, phenyl and phenoxy, with a substance which releases nitrous acid and, if appropriate, subsequent reaction of the product with a compound which forms the radicals $R^{7'}$ and/or $R^{8'}$, wherein $R^{7'}$ represents alkyl which has 1 to 4 carbon atoms and can be substituted by halogen, hydroxyl, cyano, $C_1$- to $C_4$-alkoxy, $C_1$- to $C_4$-alkylcarbonyloxy, phenoxy or phenyl and $R^{8'}$ represents alkyl which has 1 to 4 carbon atoms and can be substituted by hydroxyl, and $\overline{X}$.

Of the compounds of the formulae V, VI and VII, those wherein m represents 1, n represents 1 or 2, $R^3$ and $R^4$ represent methyl, $R^7$ represents methyl, ethyl, acetoxyethyl or hydroxyethyl, $R^8$ represents hydrogen, methyl or hydroxyethyl, $R^9$ represents H, $C_1$- to $C_4$-alkyl, $C_1$- to $C_4$-alkoxy, $C_1$ to $C_2$-alkoxycarbonyl, chlorine, nitro or benzyloxy, $R^{10}$ represents H, $C_1$- to $C_4$-alkyl, $C_1$- to $C_4$-alkoxy, hydroxy-$C_2$- to $C_4$-alkoxy, hydroxy-$C_2$- to -$C_4$-alkoxy-$C_2$- to -$C_4$-alkoxy, chlorine, $C_1$- to $C_4$-alkoxy-$C_2$- to -$C_4$-alkoxy, phenoxy, benzyloxy, benzyl or phenylazo or $R^{10}$, together with the benzene ring, forms a naphthalene or benzodioxane system, and $R^{11}$ and $R^{12}$ denote hydrogen or methyl, are to be mentioned in particular.

In a group of dyestuffs of the formula V which can particularly preferably be prepared, m and n denote 1, $R^3$, $R^4$ and $R^7$ denote methyl, $R^8$ denotes hydrogen or methyl, and $R^9$ and $R^{10}$ denote hydrogen, chlorine, methyl, ethyl, methoxy or ethoxy.

These dyestuffs are prepared from the compounds VI and VIIa.

A wide pH range has proved suitable for the simultaneous reaction of amines of the formula III and compounds of the formulae IV with nitrous acid. The reaction gives particularly satisfactory results at pH values below 6; it can thus be carried out, for example, in dilute sulphuric aid—that is to say at pH values of 2 or less. Higher pH values are also very suitable. A particularly preferred process is characterised in that an amine III, a substance which forms nitrous acid, a coupling component of the formula IV and an amount of acid such that a pH value of 4 to 6 is established are mixed in water.

The compounds III and IV are preferably employed in equimolar amounts.

Suitable substances which release nitrous acid are, for example, potassium nitrite, methyl nitrite, amyl nitrite and, above all, sodium nitrite.

Suitable acids are inorganic acids, in particular sulphuric acid, and organic acids, in particular aliphatic carboxylic acids with 1 to 4 carbon atoms, such as formic acid, acetic acid, propionic acid, chloroacetic acid, dichloroacetic acid, trichloroacetic acid, bromoacetic acid, lactic acid, β-chloro-propionic acid, methoxyacetic acid and ethoxyacetic acid.

Of these carboxylic acids, acetic acid and formic acid are preferred.

The reaction can be carried out at $-10°$ to $+75°$ C. in particular at 0° to 60° C. In general, the action of nitrous acid takes place at 0° to 20° C. The temperature can rise to above 60° C. towards the end of the reaction.

The preparation has hitherto been carried out by diazotising the aromatic amines in hydrochloric acid solution, adding the diazonium salt solution to the heterocyclic quaternary salt and coupling by adding acid-binding agents (B. 57, 144, 1924). In contrast, the process according to the invention represents a considerable simplification.

It is known that 1,3,3-trimethyl-2-methyleneindoline, dissolved in glacial acetic acid, forms the 1,3,3-trimethyl-2-formoxime-indoleninium salt in a smooth reaction (Kuhn, Winterstein and Balser, B. 63, 3182, 1930). It is therefore exceptionally surprising that reaction products are obtained in a very high purity and yield by simultaneous diazotisation and coupling by the process according to the invention.

The invention also relates to the preparation of read-to-use solutions of dyestuffs of the formula I wherein
$R^2$ represents hydrogen and
$\overline{X}$ represents the anion of an aliphatic acid with 1 to 4 carbon atoms.

In a preferred procedure, these solutions are prepared by choosing the ratio of the reactants to the aliphatic carboxylic acids or mixtures thereof such that a stable solution of the dyestuffs of the formula I is obtained directly at the end of the action of sodium nitrite. 5 to 20 mols of an aliphatic carboxylic acid, preferably 7 to 12 mols, are employed per mol of the compounds III and IV. These dyestuff solutions are particularly suitable for dyeing paper in clear yellow to red colour shades. The reaction to give finished dyestuff solutions has the advantage that no effluent is formed during the preparation.

In another particularly preferred process, 1 to 2.5 mols of the aliphatic carboxylic acid is used in dilute solution, which contains the solvent, water or solvent-/water mixtures. A pH value of 4 to 6 is thereby established. After the action of sodium nitrite, the dyestuff then precipitates in the form of the colour base II. After being isolated, these colour bases can be converted into the alkylated hydrazone dyestuffs by the action of alkylating agents in a known manner, such as is described in German Patent Specification 1,083,000.

In a further preferred process according to the invention, however, the hydrazone dyestuffs I (in which $R^1$ and $R^2$ are other than hydrogen) can also be prepared by a procedure in which the solutions or suspensions obtained in the reaction of compounds III and IV and nitrous acid are neutralised, if appropriate, and if appropriate, diluted with a water-immiscible solvent, without the colour base being isolated, and, if appropriate, the aqueous phase is separated off and the organic phase is then reacted with quaternising agents which are capable of donating or forming the radicals $R^{1'}$, $R^{2'}$ and $\overline{X}$, in the presence of an acid which donates the anion $\overline{X}$ if these quaternising agents do not form the anion $\overline{X}$, and, if appropriate, the dyestuffs are isolated.

It has been found, surprisingly, that the dyestuffs of the formula I which are prepared from colour bases which have not been isolated are outstandingly suitable for dyeing acid-modified textiles. The clarity of the colour shades thereby achieved corresponds to those obtained with dyestuffs of the formula I which are prepared in the customary manner from colour bases of the formula II which have been isolated beforehand.

A particularly preferred process is characterised in that an amine III, a substance which forms nitrous acid, a coupling component of the formula IV and an amount of acid such that a pH value of 4 to 6 is established are mixed in water, and, when the reaction has ended, the reaction mixture is diluted, if appropriate, with a water-immiscible solvent and, if appropriate, neutralised or rendered alkaline, and, preferably, the water is separated off and the organic phase is then reacted with an alkylating agent or aralkylating agent. The pH value of the mixture is kept at medium values, for example at 2-11, preferably at 6-9, during the quaternisation.

Examples of suitable solvents are: benzene, toluene, chloroform, 1,2-dichloro-propane, chlorobenzene, dichlorobenzene, nitrobenzene and 1,2-dichloro-ethane.

Suitable alkylating or aralkylating agents are, for example: esters, such as dimethyl sulphate, diethyl sulphate, methyl benzenesulphonate and methyl p-toluenesulphonate; halogen compounds, such as butyl bromide, benzyl bromide and benzyl chloride; and epoxides, such as ethylene oxide, propylene oxide, epichlorohydrin, butylene oxide and ethoxypropylene oxide in the presence of acids.

The alkylation can also be carried out in the presence of alkaline agents, for example in the presence of tertiary amines which are substituted by bulky substituents on the N atom, according to Belgian Patent No. 735,565. A particularly suitable amine which is substituted by bulky substituents is tris-(hydroxypropyl)-amine.

Alkali metal carbonates and alkaline earth metal carbonates, for example basic magnesium carbonate, or oxides, such as magnesium oxide, are also particularly suitable.

The quaternisation is preferably carried out at 30° to 120° C.

In general, the reactions of this process are started with cooling in the first phase, the coupling reaction is then brought to completion at room temperature or elevated temperature and the reactions of the process are subsequently concluded by alkylation or aralkylation, with warming. A procedure can be followed in which the new process is started by simultaneous diazotisation of an amine III and coupling of the amine to a coupling component IV at $-10°$ C. to 15° C., for example at 10° C., the coupling is brought to completion by warming the mixture slowly to 15° to 75° C., for example to 60° C., the mixture is neutralised, a solvent, such as, for example, chlorobenzene, being added, water is separated off at about 60° to 80° C., which is advantageous in order to avoid losses of quaternising agent, a base, such as, for example, MgO or basic magnesium carbonate, is added, and dimethyl sulphate is then metered in, a temperature of 30°-60° C., for example 40° C., being maintained. The addition of water, for example 1-3 mols of $H_2O$ per mol of dyestuff, towards the end of the quaternisation promotes the solubility and reaction rate and lowers the melting point of the dyestuff I as a result of hydrate formation. Dyestuffs of the formula I in which the anion is the methyl sulphate anion are thus obtained in this manner. They are in the form of solutions or suspensions in the solvents employed. These solvents can be driven off with steam in the usual manner and the dyestuffs of the formula I can be salted out from the residues.

Surprisingly, however, the dyestuffs I are also obtained in high purity when the suspensions or solutions prepared according to the invention are evaporated to dryness. The dyestuffs I thus isolated also give dyeing results which are equally as good as those of dyestuffs prepared in the customary manner from colour bases II which have been isolated beforehand. It is advantageous for the solutions or suspensions obtained after the quaternisation to be stirred, before evaporation to dryness, with acid water at, for example, 60°-90° C. in order to remove unconsumed residues of dimethyl sulphate and basic additives. Separation into an aqueous phase and an organic phase thereby occurs, the aqueous phase being largely free from dyestuff and being advantageously separated off in order to remove foreign salts. The organic phase is then evaporated to dryness. Instead of water, it is also possible to employ an aqueous salt solution, for example sodium chloride solution, for the extraction by stirring and thus to provide the dyestuff with another anion. Quantitative introduction of other anions, for example those listed in DE-AS (German Published No.) 2,255,058, columns 4–6, is effected by known procedures.

The residue obtained during steam distillation can also be evaporated to dryness, for example in a paddle dryer, and the dyestuffs I are thus obtained in excellent quality.

The dyestuffs I isolated by pressing off the mother liquor or by evaporation are particularly suitable for the formulation of liquid dyeing preparations, since they readily dissolve in water-miscible solvents to form stable solutions.

The process according to the invention is especially suitable for the preparation of particularly highly concentrated liquid dyestuff formulations. If, as described above, the solutions or suspensions of the dyestuffs I obtained after the quaternisation are extracted by stirring with acid water, the water is separated off and the organic phase is then stirred, in the presence of fresh water, with the amount of sodium hydroxide solution necessary for converting the dyestuffs I into the dyestuff hydroxides. The water is then separated off again, the dyestuff hydroxide, which is in the organic phase, is converted into a readily soluble salt by dropwise addition of an acid, for example acetic acid, and the solvent is then distilled off under reduced pressure. The residue is diluted to the desired tinctorial strength with acetic acid, water, emulsifiers and water-miscible solvents and stable dyestuff solutions with a dyestuff content of over 50% are thus obtained.

Quaternising agents other than dimethyl sulphate sometimes require higher reaction temperatures, for example up to 90° C. Quaternisation with epoxides is effected in the acid pH range. There is no particular sequence for the addition of the reagents. For example, it is possible for amines III and NaNO$_2$ to be initially introduced into water and for a mixture of a component IV with acetic acid in an amount such that a pH value of less than 6 but greater than 4 is established then to be added dropwise, and, when the reaction has ended, for the quaternisation to be carried out. It is likewise possible, for example, for almost equivalent amounts of glacial acetic acid, amine III and coupling component IV to be initially introduced into water and for aqueous sodium nitrite solution to be added dropwise thereto. In the case of this process, it has proved expedient for further glacial acetic acid subsequently to be added dropwise in an amount such that a pH value of about 5 is established. The acetic acid necessary for this can also be initially introduced.

Since the frequently liquid coupling component IV makes way for a solid as the reaction progresses, that is to say the reaction medium becomes stiffer, it is expedient to meter in water in an amount such that the mixture remains readily stirrable. It is also possible to add one of the abovementioned solvents during the coupling, in order to ensure good stirrability.

If, as explained above, the simultaneous reaction of components III and IV with nitrous acid is carried out in the weakly acid range obtained with acetic acid, it is possible, surprisingly, to dispense with neutralisation of the reaction mixture before quaternisation, since the compounds to be quaternised are present as colour bases II.

In contrast, if the reaction is carried out at lower pH values, for example if sulphuric acid is used instead of acetic acid, the mixture must be neutralised, as mentioned above, in order to be able to carry out the quaternisation.

Examples of suitable aromatic amines of the formula III are: aniline, 2-methyl-aniline, 4-methyl-aniline, 2,4-dimethyl-aniline, 3-methyl-aniline, 4-chloro-aniline, 2-chloro-aniline, 4-anisidine, 2-anisidine, 4-phenetidine, 2-phenetidine, 4-amino-benzoic acid ethyl ester, 4-amino-diphenyl ether, 4-aminophenyl benzyl ether, 4-aminophenyl 4'-chlorobenzyl ether, 4-aminophenyl 4'-methoxybenzyl ether, 4-amino-azobenzene, 4,$\beta$-hydroxyethoxy-aniline, 4,$\beta$-methoxyethoxy-aniline, 4-(hydroxyethoxyethoxy)-aniline, 4,$\beta$-hydroxy-n-propoxy-aniline, 4-($\beta$-hydroxy-$\gamma$-chloropropoxy)-aniline, 4-amino-pyrocatechol ethylene ether and 6-amino-benzodioxane. Further amines III are mentioned, for example, in DE-AS (German Published) No. 2,040,872 in columns 6, 7 and 8.

Suitable coupling components of the formula IVa are, for example: 1,3,3-trimethyl-2-methylene-2,3-dihydro-indole, 1-ethyl-3,3-dimethyl-2-methylene-2,3-dihydro-indole and 1 $\beta$-acetoxyethyl-3,3-dimethyl-2-methylene-2,3-dihydro-indole.

Further suitable coupling components are mentioned, for example, in DE-AS (German Published No.) 2,040,872, in columns 8, 9 and 10.

Suitable coupling components of the formula IVb are 2,3,3-trimethyl-indolenine and its substitution products analogous to the abovementioned examples.

Suitable compounds of the formula IVc are: 9,9,9a-trimethyl-2,3,9,9a-tetrahydro-oxazolo-[3.2a]-indole, 7,9,9,9a-tetramethyl-2,3,9,9a-tetrahydro-oxazolo-[3.2a]-indole, 7-chloro-9,9,9a-trimethyl-2,3,9,9a-tetrahydro-oxazolo-[3.2a]-indole, 7-methoxy-9,9,9a-trimethyl-2,3,9,9a-tetrahydro-oxazolo-[3.2a]-indole, 7-ethyl-9,9,9a-trimethyl-2,3,9,9a-tetrahydro-oxazolo-[3.2a]-indole, 9,9-diethyl-9a-methyl-2,3,9,9a-tetrahydro-oxazolo-[3.2a]-indole, 2,9,9,9a-tetramethyl-2,3,9,9a-tetrahydro-oxazolo-[3.2a]-indole, 3,9,9,9a-tetramethyl-2,3,9,9a-tetrahydro-oxazolo-[3.2a]-indole, 9,9,9a-trimethyl-2-phenoxy-2,3,9,9a-tetrahydro-oxazolo-[3.2a]indole, 9,9,9a-trimethyl-2-phenoxymethylene-2,3,9,9a-tetrahydro-oxazolo-[3.2a]-indole, 9,9,9a-trimethyl-2-chloromethyl-2,3,9,9a-tetrahydro-oxazolo-[3.2a]-indole, 7,9,9,9a-tetramethyl-2-phenoxymethyl-2,3,9,9a-tetrahydro-oxazolo-[3.2a]-indole, 9,9,9a-trimethyl-2-ethoxymethyl-2,3,9,9a-tetrahydro-oxazolo-[3.2a]-indole, 9,9,9a-trimethyl-2-(n-propoxymethyl)-2,3,9,9a-tetrahydro-oxazolo-[3.2a]-indole, 7-chloro-9,9,9a-trimethyl-2-methoxymethyl-2,3,9,9a-tetrahydro-oxazolo-[3.2a]-indole and 9,9,9a-trimethyl-3-chloromethyl-2,3,9,9a-tetrahydro-oxazolo-[3.2a]-indole.

EXAMPLE 1

12.3 g of 4-anisidine and 17.3 g of 1,3,3-trimethyl-2-methylene-indoline are dissolved in 50 ml of glacial acetic acid, during which the temperature rises to 42° C. After cooling the solution to 5° C., 7.3 g of sodium nitrite, dissolved in 15 ml of water, are added dropwise, whilst cooling. The reaction mixture is subsequently stirred, first with cooling and then without the bath, the temperature rising to 40° C. for a short time. After stirring the mixture for several hours, a clear solution of the dyestuff of the formula:

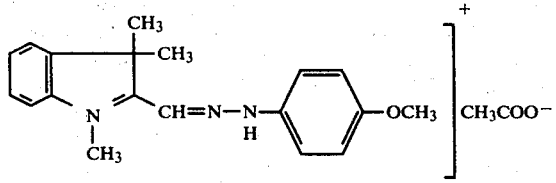

is obtained. This solution dyes paper containing mechanical wood pulp a reddish-tinged orange.

If, instead of 4-anisidine, the same amount of 2-anisidine is used as the aromatic amine, a dyestuff solution which dyes paper containing mechanical wood pulp a yellowish-tinged orange is obtained.

EXAMPLE 2

12.3 g of p-anisidine and 20.3 g of 5-methoxy-1,3,3-trimethyl-2-methylene-indoline are dissolved in 50 ml of glacial acetic acid. During this procedure, the temperature rises to 45° C. After the reaction mixture has been cooled to 5° C., 7.3 g of sodium nitrite, dissolved in 15 ml of water, are added dropwise at 5° C. After subsequently stirring the mixture for 5 hours, a clear dyestuff solution with which paper containing mechanical wood pulp is dyed a yellowish-tinged red is obtained.

If, instead of 4-anisidine, the same amount of 2-anisidine is used, a dyestuff solution which dyes paper containing mechanical wood pulp a reddish-tinged orange is obtained.

EXAMPLE 3

10.7 g of 4-toluidine and 17.3 g of 1,3,3-trimethyl-2-methylene-indoline are dissolved in 50 ml of glacial acetic acid, during which the temperature rises to 42° C. After cooling the solution to 5° C., 7.3 g of sodium nitrite, dissolved in 15 ml of water, are added dropwise, whilst cooling. The mixture is subsequently stirred at room temperature for 5 hours to give a clear solution with which a reddish-tinged yellow dyeing is obtained on paper containing mechanical wood pulp.

If, instead of 1,3,3-trimethyl-2-methylene-indoline, 20.8 g of 5-chloro-1,3,3-trimethyl-2-methylene-indoline are used and the procedure is otherwise the same, a dyestuff solution which dyes paper containing mechanical wood pulp yellowish-tinged orange is obtained.

EXAMPLE 4

9.3 g of aniline and 17.3 g of 1,3,3-trimethyl-2-methylene-indoline are dissolved in 50 ml of glacial acetic acid, during which the temperature rises to 45° C. After cooling the solution to 5° C., 7.3 g of sodium nitrite, dissolved in 15 ml of water, are added dropwise, whilst cooling, and cooling is also continued at the start of the subsequent stirring period. After 5 hours, a clear solution which dyes paper containing mechanical wood pulp reddish-tinged yellow is obtained.

If, instead of aniline, 12.7 g of 2-chloro-aniline are used and the procedure is otherwise the same, a dyestuff solution which dyes paper containing mechanical wood pulp reddish-tinged yellow is obtained.

The solution obtained with 4-chloro-aniline dyes paper containing mechanical wood pulp a yellowish-tinged orange.

EXAMPLE 5

13.7 g of 4-phenetidine and 17.3 g of 1,3,3-trimethyl-2-methylene-indoline are dissolved in 70 ml of glacial acetic acid, during which the temperature rises to 46° C. After cooling the solution to 5° C., 7.3 g of sodium nitrite, dissolved in 15 ml of water, are added dropwise at 5° C. The mixture is cooled somewhat at the start of the subsequent stirring period, and is then stirred for a further 4 hours at room temperature. The dyestuff solution dyes paper containing mechanical wood pulp an intensely reddish-tinged orange.

If, instead of p-phenetidine, the same amount of o-phenetidine is used, together with 50 ml of glacial acetic acid, a dyestuff solution which dyes paper containing mechanical wood pulp orange is obtained.

EXAMPLE 6

12.1 g of 4-amino-1,3-dimethyl-benzene and 17.3 g of 1,3,3-trimethyl-2-methylene-indoline are dissolved in 50 ml of glacial acetic acid, during which the temperature rises to 46° C. After cooling the solution to 5° C., 7.3 g of sodium nitrite, dissolved in 15 ml of water, are added dropwise at 5° C. At the start of the subsequent stirring period, a further 25 ml of glacial acetic acid are added, and a dyestuff solution which dyes paper containing mechanical wood pulp a yellowish-tinged orange is obtained.

EXAMPLE 7

12.3 g of 4-anisidine and 20.8 g of 5-chlorotribase are dissolved in 50 ml of glacial acetic acid, during which the temperature rises to 40° C. The reaction mixture is allowed to cool to 5° C., and 7.3 g of sodium nitrite, dissolved in 15 ml of water, are added dropwise at 5° C. After stirring the mixture for 5 hours, a stable dyestuff solution is obtained. Paper containing mechanical wood pulp is dyed a yellowish-tinged red.

EXAMPLE 8

10.7 g of o-toluidine and 17.3 g of tribase are dissolved in 50 ml of glacial acetic acid. The temperature rises to 45° C. After cooling the solution to 5° C., 7.3 g of sodium nitrite, dissolved in 15 ml of water, are added dropwise at 5° C., and a further 10 ml of glacial acetic acid are added before the start of the subsequent stirring period. After subsequently stirring the mixture for 5 hours, a dyestuff solution which dyes paper containing mechanical wood pulp an intensely reddish-tinged yellow is obtained.

If, instead of 2-toluidine, the same amount of 3-toluidine is used and the procedure is otherwise the same, a dull yellowish-tinged orange is obtained on paper containing mechanical wood pulp.

EXAMPLE 9

15.3 g of 2-(4-amino-phenoxy)-ethanol and 17.3 g of 1,3,3-trimethyl-2-methylene-indoline are dissolved in 50 ml of glacial acetic acid, during which the temperature rises to 40° C. After cooling the solution to 5° C., 7.3 g of sodium nitrite, dissolved in 15 ml of water, are added dropwise at 5° C. The miture is subsequently stirred for 5 hours, it being cooled somewhat at the start, and a dyestuff solution which dyes paper containing mechanical wood pulp a reddish-tinged orange is then obtained.

If, instead of 1,3,3-trimethyl-2-methylene-indoline, 20.3 g of 5-methoxy-1,3,3-trimethyl-2-methylene-indoline are employed and the procedure is otherwise the same, a dyestuff solution which dyes paper containing mechanical wood pulp yellowish-tinged red is obtained.

EXAMPLE 10

9.3 g of aniline and 20.3 g of 5-methoxy-1,3,3-trimethyl-2-methylene-indoline are dissolved in 50 ml of glacial acetic acid, during which the temperature rises to 45° C. After cooling the solution to 5° C., 7.3 g of sodium nitrite, dissolved in 15 ml of water, are added dropwise at 5° C. and the mixture is subsequently stirred at room temperature for 5 hours. A dyestuff solution which dyes paper containing mechanical wood pulp yellowish-tinged orange is obtained.

If, instead of aniline, 12.7 g of 2-chloro-aniline are used and the procedure is otherwise the same, a dyestuff solution which dyes paper containing mechanical wood pulp yellowish-tinged orange is likewise obtained.

If 4-chloro-aniline is used as the amino component, a clear orange is obtained on paper containing mechanical wood pulp.

EXAMPLE 11

10.7 g of 4-toluidine and 20.3 g of 5-methoxy-1,3,3-trimethyl-2-methylene-indoline are dissolved in 50 ml of glacial acetic acid, during which the temperature rises to 42° C. After cooling the solution to 5° C., 7.3 g of sodium nitrite, dissolved in 15 ml of water, are added dropwise at 5° C., and a further 50 ml of glacial acetic acid are added before the start of the subsequent stirring period. After subsequently stirring the mixture for 5 hours, a solution which dyes paper containing mechanical wood pulp a clear orange is obtained.

If, instead of p-toluidine, 13.7 g of p-phenetidine is used, addition of a further amount of glacial acetic acid is not necessary, and a dyestuff solution which dyes paper containing mechanical wood pulp a yellowish-tinged red is obtained.

The dyestuff obtained with 4-amino-1,3,-dimethyl-benzene dyes paper containing mechanical wood pulp reddish-tinged orange.

EXAMPLE 12

10.7 g of 2-toluidine and 20.3 g of 5-methoxy-1,3,3-trimethyl-2-methylene-indoline are dissolved in 50 ml of glacial acetic acid, during which the temperature rises to 43° C. After cooling the solution to 5° C., 7.3 g of sodium nitrite, dissolved in 15 ml of water, are added dropwise and the mixture is subsequently stirred at room temperature for 5 hours. A dyestuff solution which dyes paper containing mechanical wood pulp a yellowish-tinged orange is obtained.

If, instead of 2-toluidine, 13.7 g of 2-phenetidine are used and the procedure is otherwise the same, a dyestuff solution which dyes paper containing mechanical wood pulp reddish-tinged orange is obtained.

EXAMPLE 13

400 ml of water are stirred with 120 g of glacial acetic acid and 123 g of 4-anisidine under nitrogen, and the mixture is then cooled to 10° C. and 173 g of 1,3,3-trimethyl-2-methylene-indoline are stirred in. A solution of 70 g of sodium nitrite in 90 ml of water is added dropwise at 10° C. in the course of 1 hour. The temperature is then allowed to rise to 15° C. in the course of 1 hour and to 19° C. in the course of the next 50 minutes. The cooling bath is then removed. The suspension is now warmed, giving an exothermic reaction. After about 20–30 minutes, an internal temperature of 30°–35° C. has been reached. 250 ml of water of 30°–35° C. are added at 31°–33° C. The temperature rises to 55°–60° C. in the course of the next 10 minutes. As soon as the temperature no longer rises further, the mixture is subsequently stirred for another 5 minutes and the liquid is pressed off and the residue washed with water until free from salt. The content of 1,3,3-trimethyl-2-methylene-indoline and 4-anisidine in the suspension is less than 0.1%. The yield is 299 g of 97.6% pure=291.6 g of 100% pure colour base of the formula:

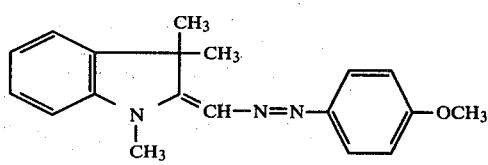

EXAMPLE 14

123 g of p-anisidine are dissolved in 400 ml of water and 60 g of glacial acetic acid, and 173 g of 1,3,3-trimethyl-2-methylene-indoline are then stirred in, whilst cooling. A solution of 70 g of sodium nitrite in 90 ml of water is subsequently added dropwise at 0° C. in the course of about 1 hour. A further 60 g of glacial acetic acid are then added dropwise in the course of 1 hour, after which a pH value of 5.9 has been established. The reaction mixture is subsequently stirred at 0° C. for 1 hour and then—after being slowly warmed-overnight at room temperature. The content of 1,3,3-trimethyl-2-methylene-indoline and p-anisidine in the suspension is less 0.1%. The pH value is 4.8. The solid is filtered off and washed with water until free from salt, to give, after drying, 295 g of 98.9% pure colour base of the formula given in Example 13.

EXAMPLE 15

20.3 g of 9,9,9a-trimethyl-2,3,9,9a-tetrahydrooxazolo-[3.2a]-indole and 12.3 g of 2-anisidine are dissolved in 50 ml of glacial acetic acid. After cooling the solution to 5° C., a solution of 7.3 g of sodium nitrite in 15 ml of water is added dropwise. During subsequent stirring, the temperature rises to 26° C., and is brought back to 15° C. by cooling. The mixture is then stirred overnight to give a clear dyestuff solution with which paper containing mechanical wood pulp is dyed orange.

If, instead of 2-anisidine, equimolecular amounts of 2-toluidine or 4-toluidine are employed and the procedure is otherwise the same, stable dyestuff solutions which dye paper containing mechanical wood pulp reddish-tinged yellow are likewise obtained.

EXAMPLE 16

23.3 g of 7-methoxy-9,9,9a-trimethyl-2,3,9,9a-tetrahydro-oxazolo-[3.2a]-indole and 12.3 g of 2-anisidine are dissolved in 50 ml of glacial acetic acid, during which the temperature rises to 37° C. After cooling the solution to 5° C., 7.3 g of sodium nitrite, dissolved in 15 ml of water, are added dropwise, during which the temperature rises to 28° C. The mixture is cooled again to 15° C. and the dyestuff solution is then stirred overnight at room temperature. The residue-free solution dyes paper containing mechanical wood pulp reddish-tinged orange.

If, instead of 2-anisidine, equimolecular amounts of 2-toluidine or 4-toluidine are employed and the procedure is otherwise the same, stable dyestuff solutions which dye paper containing mechanical wood pulp orange are likewise obtained.

EXAMPLE 17

12.3 g of 4-anisidine and 17.3 g of 1,3,3-trimethyl-2-methylene-indoline are dissolved in 50 ml of formic acid, during which the temperature rises to 61° C. After cooling the solution to 5° C., a solution of 7.3 g of sodium nitrite in 15 ml of water is added dropwise, and the reaction mixture is subsequently stirred at room temperature for 12 hours. A clear dyestuff solution which dyes paper containing mechanical wood pulp reddish-tinged orange is obtained.

If, instead of 4-anisidine, the same amount of 2-anisidine is employed and the procedure is otherwise the same, a dyestuff solution which dyes paper containing mechanical wood pulp yellowish-tinged orange is obtained.

EXAMPLE 18

12.3 g of 2-anisidine and 17.3 g of 1,3,3-trimethyl-2-methylene-indoline are dissolved in 50 ml of lactic acid, during which the temperature rises to 40° C. After cooling the solution to 5° C., 7.3 g of sodium nitrite, dissolved in 15 ml of water, are added dropwise at 5° C. The reaction mixture is stirred overnight at room temperature and a dyestuff solution which dyes paper containing mechanical wood pulp yellowish-tinged orange is thus obtained.

Equally stable dyestuff solutions are obtained if, instead of lactic acid, dichloroacetic acid, ethoxyacetic acid, propionic acid or 2-chloro-propionic acid is used.

EXAMPLE 19

10.7 g of 2-toluidine and 17.3 g of 1,3,3-trimethyl-2-methylene-indoline are dissolved in 50 ml of formic acid, during which the temperature rises to 50° C. After cooling the solution to 5° C., 7.3 g of sodium nitrite, dissolved in 15 ml of water, are added dropwise at 5° C., and the reaction mixture is subsequently stirred. During this procedure, the temperature initially rises to 28° C. After cooling the mixture to 15° C., stirring is continued at room temperature and, after stirring the mixture for several hours, a clear dyestuff solution which dyes paper containing mechanical wood pulp reddish-tinged yellow is obtained.

Lactic acid or propionic acid can also be employed instead of formic acid, with the same success.

EXAMPLE 20

400 ml of water are stirred with 120 g of glacial acetic acid and 123 g of p-anisidine, under nitrogen. The mixture is then cooled to 10° C. and 173 g of 1,3,3-trimethyl-2-methylene-indoline are stirred in. A solution of 70 g of sodium nitrite in 90 ml of water is added dropwise at 10° C. in the course of 1 hour. The temperature is then allowed to rise to 15° C. in the course of 1 hour and to 19° C. in the course of the next 50 minutes. The cooling bath is then removed. The suspension is now warmed, giving an exothermic reaction. After about 20–30 minutes, an internal temperature of 30°–35° C. has been reached. At 33° C., dropwise addition of 50 ml of chlorobenzene is started, the rate increasing such that about 10 ml of solvent have been added dropwise when 50° C. is reached, about 20–30 ml of solvent have been added when 60° C. is reached and 40–50 ml have been added when the maximum temperature of about 61°–62° C. is reached. The mixture is subsequently stirred for 5 minutes. The content of 1,3,3-trimethyl-2-methylene-indoline and p-anisidine in the suspension is 0.1% or less. 450 ml of chlorobenzene are added to the suspension, the mixture is heated to 80° C., the stirrer is switched off and the water (upper layer) is siphoned off. The organic phase is cooled to 40° C., 6 g of magnesium oxide are added and, at 40° C., 134 g of dimethyl sulphate are added dropwise in the course of 1 hour and 18 g of water are added dropwise in the course of the next hour. The mixture is then subsequently stirred at 40° C. for 6 hours. During this period, a further 20 g of dimethyl sulphate are added after about 2 hours. Thereafter, the content of non-quaternised dyestuff in the suspension is less than 0.03%. After adding 200 ml of water, the pH value is adjusted to between 5 and 2.5 with concentrated hydrochloric acid. The solvent is then driven off with steam. The volume of the distillation residue is 1,100 ml. If desired, it can be clarified with active charcoal. 15 g of an aromatic polyglycol ether is stirred in and, as soon as the mixture has cooled to 48°–50° C., 55 g of sodium chloride are sprinkled in. After stirring the mixture at room temperature overnight, the liquid is pressed off and the residue is washed with 750 ml of 5% strength sodium chloride solution. The dyestuff of the formula

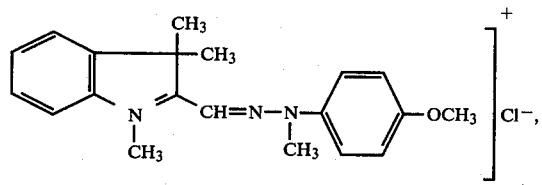

which dyes polyacrylonitrile golden yellow, is obtained. It is chromatograpically purer than a preparation which has been obtained by quaternising a colour base of the formula

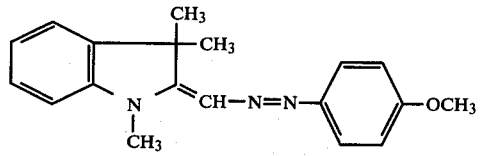

prepared and isolated by customary processes.

If, instead of p-anisidine and 1,3,3-trimethyl-2-methylene-indoline, the aromatic amines and 2-methylene-indolines listed in the following table are reacted with one another in an analogous procedure, dyestuffs which dye polyacrylonitrile in the colour shades indicated are obtained:

| Aromatic amine | 2-Methylene-indoline | Colour shade on PAC |
| --- | --- | --- |
| o-Anisidine | 1,3,3-Trimethyl-2-methylene-indoline | greenish-tinged yellow |
| 6-Amino-benzo-dioxane | " | golden yellow |
| p-Toluidine | " | yellow |

-continued

| Aromatic amine | 2-Methylene-indoline | Colour shade on PAC |
|---|---|---|
| o-Toluidine | " | greenish-tinged yellow |
| m-Toluidine | " | yellow |
| p-Phenetidine | " | golden yellow |
| o-Phenetidine | " | greenish-tinged yellow |
| 4-Amino-1,3-dimethyl-benzene | " | yellow |
| 2-Chloro-aniline | " | greenish-tinged yellow |
| 4-Chloro-aniline | " | yellow |
| 4-Aminophenyl glycol ether | " | golden yellow |
| Aniline | " | yellow |
| p-Anisidine | 1,3,3-Trimethyl-5-methoxy-2-methylene-indoline | yellowish-tinged orange |
| " | 1,3,3-Trimethyl-5-chloro-2-methylene-indoline | yellowish-tinged orange |
| " | 1,3,3-Trimethyl-5-carbomethoxy-2-methylene-indoline | orange |
| " | 1,3,3-Trimethyl-5-nitro-2-methylene-indoline | orange |
| " | 1 β-Acetoxyethyl-3,3-dimethyl-2-methylene-indoline | golden yellow |
| " | 9,9,9a-Trimethyl-2,3,9,9a-tetrahydro-oxazolo-[3.2a]-indole | golden yellow |

EXAMPLE 21

The procedure followed is as in Example 20. After the pH value has been adjusted to 2.5 to 5, the mixture is evaporated to dryness under reduced pressure. The methosulphate of the dyestuff described in Example 20 is thus obtained. The colour shade and clarity of the dyeing obtained with this dyestuff on polyacrylonitrile correspond to the colour and clarity of a preparation obtained from an isolated colour base by the customary process.

EXAMPLE 22

The procedure followed is as in Example 20. After the pH value has been adjusted to 2.5 to 5, 58 g of sodium chloride and 100 ml of saturated sodium chloride solution are stirred in, the mixture is heated to 70° C. and the aqueous layer is separated off. The organic layer is evaporated to dryness in a paddle dryer. An orange-red powder which is chiefly the chloride of the dyestuff described in Example 20 and is equally as suitable for dyeing acid-modified synthetic fibres as the preparation described in Example 21 is obtained.

EXAMPLE 23

The procedure followed is as in Example 22. The residue obtained after evaporation is dissolved in 342 g of glacial acetic acid, 162 g of propylene glycol, 760 g of ethylene glycol and 100 g of water. A stable solution which is suitable for use as a liquid dyeing preparation for dyeing acid-modified synthetic fibres is obtained.

EXAMPLE 24

The procedure followed is as in Example 20, but 1,2-dichloropropane is employed instead of chlorobenzene. The temperature is increased to at most 70° C., and not to 80° C. After the pH value has been adjusted to 2.5 to 5, the aqueous layer is siphoned off. 100 ml of water are then added, and 100 g of 45% strength sodium hydroxide solution are added dropwise at 20° C. After subsequently stirring the mixture for 3 hours, a pH value of 9-10 has been established. The supernatant water is siphoned off, 150 g of glacial acetic acid are added to the organic layer and the mixture is evaporated under reduced pressure until it no longer contains dichloropropane. The residue is diluted with a water-miscible solvent or solvent mixture (suitable solvents are, for example, glycols, glycol esters, alkylglycol esters and glycerol esters), with acetic acid and with an emulsifier (suitable emulsifiers are, for example, phenol polyglycol ethers, such as nonylphenol polyglycol ether), and the solution is diluted with an amount of water such that a liquid formulation which has twice the tinctorial strength of the formulation prepared in Example 23 is obtained. The formulation is stable, and particularly suitable for dyeing acid-modified synthetic fibres.

EXAMPLE 25

The procedure followed is initially as in Example 20. When the coupling has ended, 450 ml of chlorobenzene are added, as in that example, the mixture is cooled to 20° C. and the pH value, which is 4.9, is adjusted to 7 at this temperature by dropwise addition of 45% textile sodium hydroxide solution. The mixture is then heated to 80° C., the stirrer is switched off and the water is drained off at the bottom. The organic phase is cooled to 40° C. and 2.4 g of MgO are added, and the further procedure followed is as in Example 20. An equally good result as in Example 20 is obtained.

EXAMPLE 26

123 g of p-anisidine are dissolved in 400 ml of water and 306 g of 48% strength sulphuric acid, and 159 g of 2,3,3-trimethyl-indolenine are then stirred in, whilst cooling. A solution of 70 g of sodium nitrite in 90 ml of water is then added dropwise at 0° C. in the course of 2 hours. The mixture is subsequently stirred at 0° C. for 1 hour and the temerature is then allowed to rise slowly to 20° C. in the course of 4 hours. The mixture is then stirred overnight at room temperature. 400 ml of 1,2-dichloro-propane and 200 ml of water are subsequently added, and 45% strength sodium hydroxide solution is added dropwise until the pH value remains constant at 7. During this period, the mixture is warmed slowly to 60° C. The aqueous layer is separated off. 26 g of magnesium oxide are added to the organic phase and 268 g of dimethyl sulphate are then added dropwise at 45° C. in the course of 3 hours. 36 g of water are subsequently added dropwise at 40° C. in the course of 1 hour. The mixture is subsequently stirred at 45° C. for 5 hours, 400 ml of water are added and the pH value is adjusted to 2.5–5 with a little hydrochloric acid. The aqueous layer is then separated off at 60° C. and discarded. The solvent is driven off from the organic phase by means of steam. The distillation residue is diluted with water to 200 ml, 30 g of an aromatic polyglycol ether are added and 100 g of sodium chloride are sprinkled in at about 50° C. After stirring the mixture at room temperature overnight, the liquid is pressed off and the residue is washed with 1 l of 5% strength sodium chloride solution. The dyestuff described in Example 20 is obtained.

EXAMPLE 27

93 g of aniline are dissolved in 400 ml of water and 204 g of 48% strength sulphuric acid, and 173 g of 1,3,3-trimethyl-2-methylene-indoline is then stirred into the suspension obtained on cooling. A solution of 70 g of NaNO$_2$ in 90 ml of water is subsequently added dropwise at 0° C. in the course of 1 hour. The mixture is subsequently stirred at 0° C. for 1 hour, the temperature of the suspension is then allowed to rise slowly to 20° C. in the course of the next 4 hours and the suspension is diluted with 100 ml of water and stirred at room temperature overnight. 500 ml of chlorobenzene are then added and the pH value is adjusted to 7 by dropwise addition of 45% strength sodium hydroxide solution. The mixture is then heated to 80° C., the stirrer is switched off and the water is drained off. The organic phase is cooled to 50° C., 2.5 g of MgO are added and the further procedure followed is as in Example 20. The dyestuff of the formula

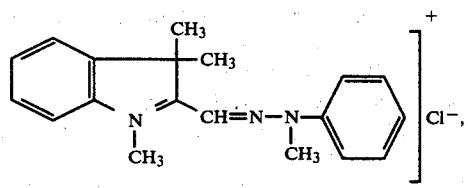

which dyes acid-modified synthetic fibres yellow, is obtained.

EXAMPLE 28

Polyacrylonitrile fibres are introduced, at 40° C. in a liquor ratio of 1:40, into an aqueous bath which contains, per liter, 0.75 g of 30% strength acetic acid, 0.38 g of sodium acetate and 0.2 g of the distillation residue described in Example 22. The bath is heated to the boiling point in the course of 20–30 minutes and kept at this temperature for 30–60 minutes. After rinsing and drying, a clear golden yellow dyeing with very good fastness properties is obtained.

EXAMPLE 29

The procedure followed is as in Example 14, but 50 ml of methanol are employed instead of 400 ml of water. When the reaction has ended, the suspension contains less than 0.05% of 1,3,3-trimethyl-2-methylene-indoline and p-anisidine. It is diluted with 400 ml of water. The pH value is then 4.7. 292.9 g of the colour base described in Example 13 are obtained.

We claim:

1. Process for the preparation of dyestuffs of the general formula

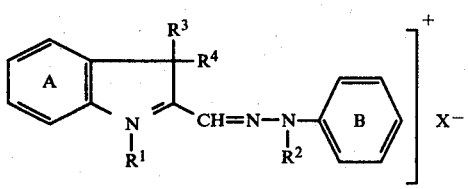

or colour bases of the general formula

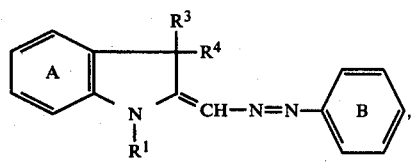

wherein
R$^1$ and R$^2$ denote hydrogen, alkyl, alkenyl or aralkyl,
R$^3$ and R$^4$ denote methyl or ethyl and
X denotes an anion, and wherein the rings A and B and the radicals R$^1$ and R$^2$ can carry non-ionic substituents and the rings A and B can carry further fused-on rings, characterised in that an amine of the formula

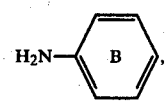

wherein
B has the abovementioned meaning, and a compound of the formula

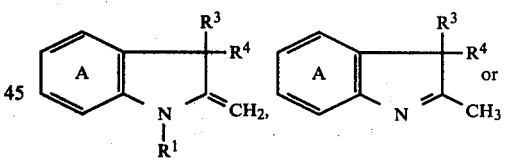

wherein
R$^1$, R$^3$, R$^4$ and A have the abovementioned meanings and
R$^5$ and R$^6$ represent hydrogen, alkyl, alkoxy, phenoxy or phenyl, are reacted, in the presence of an acid, with a substance which releases nitrous acid and, if appropriate, the product is then reacted with a compound which forms the radicals R$^{1'}$ and/or R$^{2'}$, which represent alkyl, alkenyl or aralkyl which are optionally substituted by non-ionic radicals, and X.

2. Process for the preparation of dyestuffs of the general formula

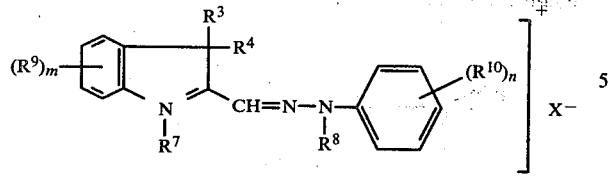

or of colour bases of the formula

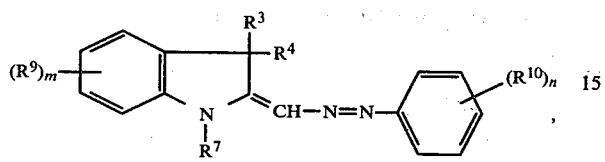

wherein $R^3$, $R^4$ and $\overline{X}$ have the same meaning as in claim 1, $R^7$ represents hydrogen, or alkyl which has 1 to 4 carbon atoms and can be substituted by halogen, hydroxyl, cyano, $C_1$- to $C_4$-alkoxy, $C_1$- to $C_4$-alkylcarbonyloxy, phenoxy or phenyl, $R^8$ represents hydrogen, or alkyl which has 1 to 4 carbon atoms and can be substituted by hydroxyl, $R^9$ and $R^{10}$ represent hydrogen, halogen, alkyl or alkoxy with 1 to 4 C atoms, benzyl, benzyloxy, phenyl or phenoxy radicals, which can in turn be substituted by halogen or alkyl or alkoxy with 1 to 4 C atoms, or represent acetyl, benzoyl or a carboxylic acid ester radical with 1 to 4 C atoms, or $R^{10}$ represents phenylazo or, together with the benzene ring, a tetralin, naphthalene or benzodioxane ring system, and m and n represent 1 or 2, characterised in that an amine of the formula

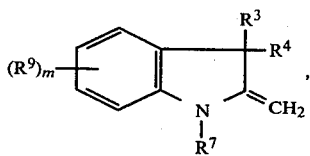

wherein $R^{10}$ and n have the abovementioned meaning, and a compound of the formula

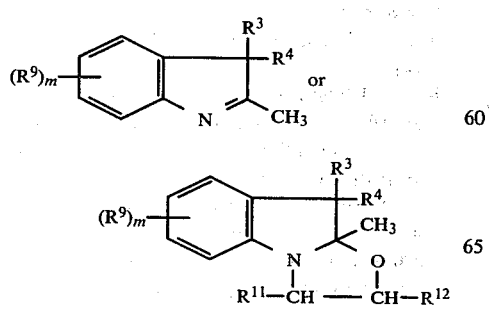

wherein $R^3$, $R^4$, $R^7$ to $R^9$ and m have the abovementioned meaning and $R^{11}$ and $R^{12}$ represent hydrogen, alkyl or alkoxy with 1 to 4 carbon atoms, phenyl or phenoxy, are reacted with a substance which releases nitrous acid, and if appropriate, the product is then reacted with a compound which forms the radicals $R^{7'}$ and/or $R^{8'}$, wherein $R^{7'}$ represents alkyl which has 1 to 4 carbon atoms and can be substituted by halogen, hydroxyl, cyano, $C_1$- to $C_4$-alkoxy, $C_1$- to $C_4$-alkylcarbonyloxy, phenoxy or phenyl and $R^{8'}$ represents alkyl which has 1 to 4 carbon atoms and can be substituted by hydroxyl, and $\overline{X}$.

3. Process according to claim 2, characterized in that m represents 1, n represents 1 or 2, $R^3$ and $R^4$ represent methyl, $R^7$ represents methyl, ethyl, acetoxyethyl or hydroxyethyl, $R^8$ represents hydrogen, methyl or hydroxyethyl, $R^9$ represents H, $C_1$- to $C_4$-alkyl, $C_1$- to $C_4$-alkoxy, $C_1$- to $C_2$-alkoxycarbonyl, chlorine, nitro or benzyloxy, $R^{10}$ represents H, $C_1$- to $C_4$-alkyl, $C_1$- to $C_4$-alkoxy, hydroxy-$C_2$- to $C_4$-alkoxy, hydroxy-$C_2$- to -$C_4$-alkoxy-$C_2$- to -$C_4$-alkoxy, chlorine, $C_1$- to $C_4$-alkoxy-$C_2$- to -$C_4$-alkoxy, phenoxy, benzyloxy, benzyl or phenylazo, or $R^{10}$, together with the benzene ring, forms a naphthalene or benzodioxane system, and $R^{11}$ and $R^{12}$ denote hydrogen or methyl.

4. Process according to claim 2, characterised in that m and n denote 1, $R^3$, $R^4$ and $R^7$ denote methyl, $R^8$ denotes hydrogen or methyl, and $R^9$ and $R^{10}$ denote hydrogen, chlorine, methyl, ethyl, methoxy or ethoxy.

5. Process according to claim 1 for the preparation of dyestuffs of the formula

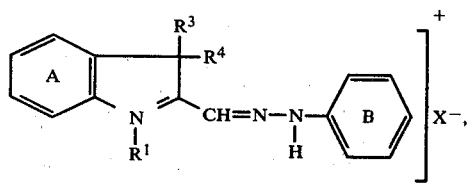

wherein $R^1$, $R^3$, $R^4$, A and B have the meaning given in claim 1, and $\overline{X}$ represents the anion of an aliphatic carboxylic acid, characterised in that the ratio of the reactants is chosen such that a stable dyestuff solution is formed directly at the end of the reaction of sodium nitrite, by employing 5–20 mols, preferably 7 to 12 mols, of an aliphatic carboxylic acid per mol of starting components.

6. Process according to claim 1 for the preparation of colour bases of the formula

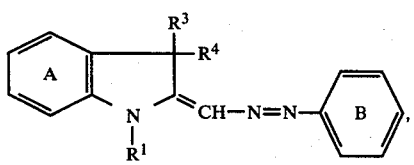

wherein $R^1$, $R^3$, $R^4$, A and B have the meaning given in claim 1, characterised in that aliphatic carboxylic acids are used in dilute solution which contains a solvent, water or solvent/water mixtures, a pH value of 4–6 being established and the colour base precipitating, after the action of $NaNO_2$.

7. Process for the preparation of dyestuffs of the formula

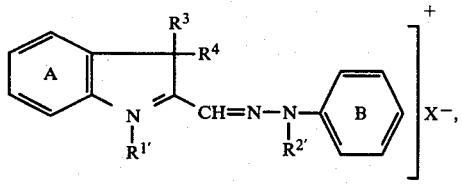

wherein $R^{1'}$, $R^{2'}$, $R^3$, $R^4$, A, B and $\overline{X}$ have the meaning given in claim 1, characterised in that an amine of the formula

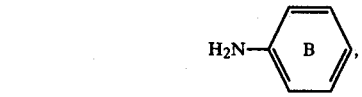

wherein

B has the meaning given in claim 1, and a compound of the formula

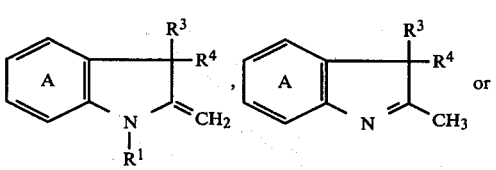

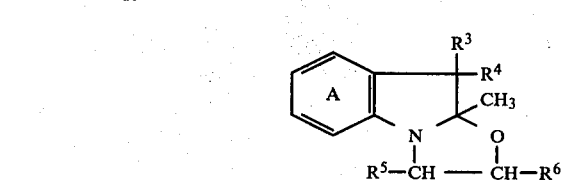

wherein $R^1$, $R^3$, $R^4$, $R^5$, $R^6$ and A have the same meaning as in claim 1, are reacted, in the presence of an acid, with a substance which releases nitrous acid and the mixture is neutralised, if appropriate, and then reacted with a compound which forms the radicals $R^{1'}$ and/or $R^{2'}$, which have the meaning given in claim 1, and $\overline{X}$.

8. Process according to claim 7, characterised in that, before the quaternisation, the reaction mixture is diluted with a water-immiscible solvent and, if appropriate, the aqueous phase is separated off.

9. Process according to claims 7 and 8, characterised in that, before the quaternisation, pH values of 4 to 6 are employed.

10. Process according to claim 9, characterised in that the reaction mixture is not neutralised before the quaternisation.

* * * * *

UNITED STATES PATENT AND TRADEMARK OFFICE
CERTIFICATE OF CORRECTION

PATENT NO. : 4,376,728

DATED : March 15, 1983

INVENTOR(S) : Roderich Raue, et al

It is certified that error appears in the above-identified patent and that said Letters Patent is hereby corrected as shown below:

| | |
|---|---|
| Col. 2, line 37 | Delete "$\gamma$" and insert --$\lambda$--. |
| Col. 12, line 7 | Delete "=" and insert -- $\hat{=}$ -- |
| Col. 16, line 45 | Delete "textile" and insert --strength-- |
| Col. 20, line 62 | Delete "reaction" and insert --action-- |

Signed and Sealed this

Twenty-first Day of June 1983

[SEAL]

Attest:

DONALD J. QUIGG

*Attesting Officer*     *Acting Commissioner of Patents and Trademarks*